United States Patent Office 3,651,136
Patented Mar. 21, 1972

3,651,136
SYNTHESIS OF DL-THREONINE
George Foulds, Wilmington, Del., assignor to Sun Oil Company, Philadelphia, Pa.
No Drawing. Filed Nov. 6, 1969, Ser. No. 874,716
Int. Cl. C07c *101/30*
U.S. Cl. 260—534 M
6 Claims

ABSTRACT OF THE DISCLOSURE

DL-threonine may be prepared in good yield by a novel three-step process comprising the epoxidation of crotonic acid, followed by addition of chlorine and then ammonia to the resulting intermediates.

BACKGROUND OF THE INVENTION

This invention relates to a novel three-step synthesis of the amino acid, DL-threonine (2-amino-3-hydroxy-butyric acid), starting with crotonic acid.

Several synthetic routes for the preparation of DL-threonine are generally known in the art. Many of these methods, however, as for example those starting with DL-lactic acid, acetoacetic ester or glycine, are characterized by the use of relatively expensive starting materials or reagents and, more important, they result in the formation of substantial amounts of the unwanted by-product DL-allothreonine, which is hard to separate and represents an economic loss in any event.

SUMMARY OF THE INVENTION

It has now been found, in accordance with this process, that DL-threonine may be prepared in good yield and with little formation of the unwanted by-product, DL-allothreonine, by the following series of steps:

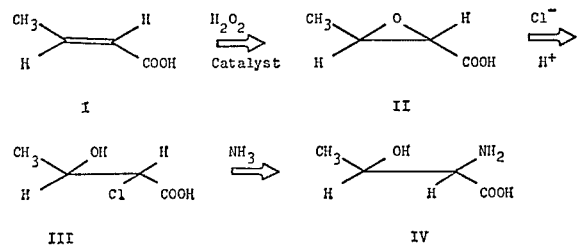

DESCRIPTION OF THE INVENTION

Compound I, crotonic acid, is converted to Compound II, crotonic acid epoxide, by reaction with hydrogen peroxide in the presence of an epoxidation catalyst, as for example a suitable tungstate or molybdate salt such as sodium tungstate, desirably in a slightly acidic medium. Any alkaline material which will maintain the pH slightly above about 3.5–4 may be employed, but preferably sodium hydroxide should be used, adding it incrementally during the reaction to maintain the pH level. If necessary, the reactor should be stirred and cooled to hold the temperature below about 65° C., particularly during the addition of the hydrogen peroxide. The amount of hydrogen peroxide employed should theoretically be equimolar amounts relative to the starting material, but in practice a slight excess of hydrogen peroxide is preferred.

Following this reaction the intermediate may conveniently be recovered by treating the solution with an inorganic acid such as $H_2SO_4$ to provide a pH of about 2 to 3, and then saturating the solution with a salt which will precipitate the epoxide such as ammonium sulfate, followed by extracting it with a suitable solvent such as diethyl ether to recover Compound II in substantially pure form.

The epoxide intermediate may then conveniently be converted to Compound III, i.e. erythro 2-chloro-3-hydroxy-butyric acid, by first dissolving the epoxide in water, adjusting the pH of the solution to obtain a slightly acidic medium, preferably a pH of about 3.5–4, and adding an inorganic chloride salt, preferably NaCl, dropwise with cooling to maintain the temperature at about 20 to 25° C. The resulting chlorinated intermediate (III) may then be recovered by removal of the water to form a concentrate, followed by recrystallization of the intermediate from a suitable organic solvent such as a chloroform-diethyl ether mixture. The amount of chloride reactant employed should be a 1:1 molar ratio based on the epoxide, although a slight excess of chloride is generally desirable.

The final product, DL-threonine (IV) is then obtained by simply dissolving Compound III in water and reacting it with ammonia, as ammonium hydroxide, preferably in large excess. The product may then be recovered in good yield by cooling the reaction mixture, removing the water and crystallizing the DL-threonine from an aqueous alcohol. The small amounts of allothreonine present, having a different solubility in alcohol than DL-threonine, are thus separated from the reaction mixture.

It will be understood that although each of the steps is described in combination with a separation and recovery step, that in actual practice, except for removal of the epoxidation catalyst from the first step, the process may be carried out as a continuous one.

The preparation of DL-threonine and its respective intermediates is more fully described in the following examples.

Example 1

To one mole crotonic acid (I) in a solution of 20 gm. sodium hydroxide in 250 ml. water is added 0.1 mole sodium tungstate dihydrate with heating at 55° to effect dissolution. 1.3 moles hydrogen peroxide (as the 30 percent solution) is added dropwise with cooling to hold reaction below 65° and addition of sodium hydroxide to hold the pH above 4. After one hour, the reaction is cooled and 30 percent $H_2SO_4$ is added to give pH 2.5. The solution is saturated with ammonium sulfate and extracted with ether. The ether is removed in vacuo to give 50 percent yield of 87 percent pure product (II).

Example 2

0.5 mole crotonic acid epoxide (II) is dissolved in 250 ml. water. 250 ml. 2.5 M NaCl adjusted to pH 3.5–4 is added dropwise at room temperature with cooling to maintain temperature at 20 to 25°. Water is removed in vacuo to give a syrupy acid. The acid is recrystallized from chloroform-diethyl ether to give 60 percent erythro 2-chloro-3-hydroxy-butyric acid (III).

Example 3

A solution of 0.05 mole II in 20 ml. water is added dropwise to 100 ml. of 10 N $NH_4OH$. Upon completion of the addition the reaction is cooled and the ammonia and water removed in vacuo. The product is crystallized from hot ethanol-water (3:1) to give DL-threonine (IV).

What is claimed is:
1. A process for the production of DL-threonine which comprises: (1) reacting crotonic acid with hydrogen peroxide in the presence of an epoxidation catalyst to form crotonic acid epoxide, and thereafter separating the epoxidation catalyst from the reaction medium; (2) contacting the epoxide with an inorganic chloride salt to form erythro 2-chloro-3-hydroxy-butyric acid; and (3) reacting the latter material with ammonia to obtain DL-threonine.

2. The process according to claim 1 wherein the epoxidation catalyst is a tungstate or molybdate salt.

3. The process according to claim 1 wherein steps (1) and (2) are carried out at a pH of about 3.5–4.

4. The process according to claim 1 wherein a large excess of ammonia is employed in step (3).

5. A process according to claim 1 for the production of DL-threonine which comprises: (1) reacting crotonic acid with an excess of hydrogen peroxide in the presence of an epoxidation catalyst at a pH of about 3.5–4, and thereafter separating the epoxidation catalyst from the reaction medium; (2) contacting the crotonic acid epoxide with sodium chloride at a pH of about 3.5–4; and (3) reacting the chlorinated intermediate with an excess of ammonia.

6. The process according to claim 5 wherein the epoxidation catalyst is a tungstate or molybdate salt.

References Cited

Micyrdichian, Organic Synthesis, 1957, vol. I, pp. 84, 88, 465.

LORRAINE A. WEINBERGER, Primary Examiner

J. L. DAVISON, Assistant Examiner

U.S. Cl. X.R.

260—348.5 R, 535 H